US012173511B1

(12) United States Patent
Lair

(10) Patent No.: US 12,173,511 B1
(45) Date of Patent: Dec. 24, 2024

(54) MOTORIZED SYSTEM ON STAIRWAY FOR ACCESSING SPACE ABOVE OR BELOW AN ELEVATED STRUCTURE

(71) Applicant: Jean-Pierre Lair, Georgetown, TX (US)

(72) Inventor: Jean-Pierre Lair, Georgetown, TX (US)

( * ) Notice: Subject to any disclaimer, the term of this patent is extended or adjusted under 35 U.S.C. 154(b) by 0 days.

(21) Appl. No.: 18/635,429

(22) Filed: Apr. 15, 2024

(51) Int. Cl.
*E04F 11/06* (2006.01)
*E06C 1/12* (2006.01)

(52) U.S. Cl.
CPC .............. *E04F 11/068* (2013.01); *E06C 1/12* (2013.01)

(58) Field of Classification Search
CPC ............ E04F 11/068; E04F 11/04; E06C 1/12
See application file for complete search history.

(56) References Cited

U.S. PATENT DOCUMENTS 6,866,118 B1 * 3/2005 Battenberg ................ E06C 9/08 182/78
7,841,448 B2 11/2010 Lair
8,028,804 B2 10/2011 Lair
9,759,374 B1 9/2017 Lair
2009/0288351 A1 * 11/2009 Burke .................. E04F 11/064 52/183

FOREIGN PATENT DOCUMENTS

GB 2507578 A * 5/2014 ............... E06C 1/10

* cited by examiner

*Primary Examiner* — Jessica L Laux
*Assistant Examiner* — Jacob G Sweeney
(74) *Attorney, Agent, or Firm* — Pillsbury Winthrop Shaw Pittman LLP

(57) ABSTRACT

An automated ladder apparatus mounted on a cover and including a plurality of ladder sections to provide access to a space above or below an elevated structure, includes a pivotable cover for an opening in the elevated structure that is pivotable about a pivot axis, and a motorized system including a gearmotor and an energizable brake, the motorized system being mounted on the pivotable cover such that the motorized system and the pivotable cover are movable in unison when the pivotable cover pivots about the pivot axis, the pivotable cover being pivotable between at least a first position to allow access to the space through the opening and a second position in which the pivotable cover substantially covers the opening. The gearmotor has a gear ratio sized to allow the opening of the pivotable cover under gravity only when the energizable brake is disengaged.

17 Claims, 11 Drawing Sheets

MOTORIZED SYSTEM ON STAIRWAY FOR ACCESSING SPACE ABOVE OR BELOW AN ELEVATED STRUCTURE

FIELD

The present invention relates to a driving mechanism of an automatic extendable and retractable stairway that is installed on an access cover hinged on a framing structure that surrounds an opening to provide access to a space above or below an elevated structure.

BACKGROUND

Ladders for attic access are widely used by the people in their private homes. Attics access is usually provided above the garages and/or living quarters of private homes. The most common attic access consists of an access panel, spring loaded in the closed position and hinged on a wooden structure frame surrounding an opening in the ceiling. The ladder is usually composed of three sections folded and hinged on top of each other. The panel and the ladder are only manually operable. Although still widely used, this type of stairway is not only difficult to manually operate but also has revealed itself to be unsafe.

U.S. Pat. Nos. 7,841,448 and 8,028,804 describe an automatic ladder for attic access that can be retracted and extended by an electric motor. While the technology is a significant improvement over the manual attic ladder mentioned previously, its motorized system is costly and may lead to a single unwanted mechanical failure.

U.S. Pat. No. 9,759,374 describes a gravity descending and motorized ascending load carrying platform that has its motorized system installed underneath the platform. The only capability of the technology is to move vertically the complete platform. Nothing on top of it is actuated by the motorized system. In addition, the complexity of its motorized system is costly and may lead to a single unwanted mechanical failure.

It would consequently be of great benefit to provide a low-cost motorized mechanism where no single mechanical failure can compromise the safe operation of the stairway for easy access to a space above or below an elevated structure.

SUMMARY

An aspect of the present invention overcomes the drawbacks of the prior art by providing a less costly driving mechanism to an automatic extendable and retractable stairway where no single mechanical failure can compromise the safety of the stairway. In an aspect of the present disclosure, the stairway is installed on an access cover hinged on a framing structure that surrounds an opening to provide access to a space above or below an elevated structure. More particularly, in an embodiment of the disclosure, an access cover supports the motorized system. The cover is hinged towards the forward end of a framing structure that supports the cover, the mechanism and the sections of ladders. The frame structure supports in its forward end and in its aft end at least one pulley that via at least one cable connects directly to at least one reel mounted on the at least one shaft driven only by a single gearmotor mounted on the cover. The single gearmotor controls a) the rate of the full opening of the cover, then the extending of the sections ladders, and b) the retracting of the section ladders then the full closing of the cover over the opening of the space of the elevated structure.

In an embodiment of the disclosure, the driving mechanism is configured to enable the access cover and the extendable and retractable stairway to reach two positions. In the first position the driving mechanism opens the cover driving it away from the opening, then extends the extendable stairway, to the ground, on top of the cover. In the second position the driving mechanism retracts the retractable stairway on the cover then drives the cover and the retracted stairway to close the opening of the space above or below the elevated structure. The driving mechanism comprises a gearmotor that directly connects to one or more reels for driving the apparatus to its first position and for controlling the speed of uncovering the access cover and the extending of the stairway from its first position to its second position. The input shaft of the diving mechanism is equipped with a brake able to lock the access cover and the stairway in their first position, their second position and any intermediate positions.

In an embodiment of the disclosure, the output of the gearmotor is directly connected to the at least one shaft that holds at least one reel for a) winding the at least one cable for retracting the section ladders then the full closing of the cover, and b) for unwinding said cable to drive the cover to its full opened position then to extend the ladder sections to the floor. Because the gearmotor, also, directly drives the shaft/reel in the unwinding direction, the last sliding ladder section will always reach the floor.

In an embodiment of the disclosure, the single gearmotor is fitted with a brake that holds the cover in its first position.

In an embodiment of the disclosure, the brake is an electromechanical brake configured a) to engage when electric power to the driving mechanism is off and b) to release when the electric power to the driving mechanism is on.

In an embodiment of the disclosure, the gearmotor is positioned at the back of the cover for minimizing the output torque required for driving the cover and the section ladders to their second position.

In an embodiment, there is provided an automated ladder apparatus mounted on a cover and including a plurality of ladder sections to provide access to a space above or below an elevated structure, the automated ladder apparatus comprising:

- a pivotable cover for an opening in said elevated structure that is pivotable about a pivot axis;
- a motorized system comprising a gearmotor and an energizable brake, the motorized system being mounted on said pivotable cover such that the motorized system and the pivotable cover are movable in unison when the pivotable cover pivots about the pivot axis, said pivotable cover being pivotable between at least a first position to allow access to the space through the opening and a second position in which the cover substantially covers said opening;
- said motorized system is configured to retract one or more of the plurality of ladder sections on the pivotable cover, then to move the cover against the opening to close it;
- said motorized system is configured to pivot the pivotable cover so as to move the pivotable cover away from the opening, then to extend said one or more of the plurality of ladder sections away from the pivotable cover;
- said motorized system being coupled to at least one shaft fitted with at least one reel;
- said at least one reel coupled to at least one of said plurality of sections via a cable to either (a) assist the pivotable cover to move away from the opening, then to extend said one or more of the plurality of ladder sections away from the cover, or (b) retract on the pivotable cover said one or more of the plurality of ladder sections then to move the pivotable cover against the opening to close it, or both (a) and (b);

said gearmotor being coupled to an energizable brake;

said energizable brake being configured to hold the pivotable cover over the opening to close the opening or to hold the pivotable cover immobile at any position in between the first and second positions;

said gearmotor having a gear ratio sized to allow the opening of the pivotable cover under gravity only when the energizable brake is disengaged.

In an embodiment of the disclosure, the gearmotor has a low gear ratio for enabling the cover and the section ladders to transit, under gravity only, towards their first position when the brake of the gearmotor is released. The term "low" in the recitation "low gear ratio" is intended to cover configurations of gear ratio that in the range from 1/40 to 1/15. In an embodiment of the disclosure, the gear ratio is in the range from 1/38 to 1/18, such as from 1/35 to 1/20 and in an embodiment from 1/30 to 1/25.

In an embodiment of the disclosure, the gearmotor is constructed and arranged to perform three distinct functions. The first function is to hold the cover closed with the section ladders retracted on it. The second function is to fully open the cover then to extend the section ladders to the floor. The third function is to retract the section ladders on the cover then close the cover.

In an embodiment of the disclosure, the electromechanical brake is independently energized from the gearmotor.

In another embodiment of the disclosure, the electromechanical brake has a manual release.

In an embodiment of the disclosure, the gearmotor is mounted near the aft end of the cover.

In an embodiment of the disclosure, the gearmotor has a male input shaft and a female shaft output.

According to an embodiment of the disclosure, the female shaft output of the gearmotor is fitted with at least one male shaft on which mounts a reel that connects directly to the at least one cable for driving the cover and the ladder sections to either their first position or their second position. This arrangement is greatly beneficial for reducing the number of mechanical components and avoiding the use of toothed wheels and/or chains and/or belts.

According to yet another embodiment of the disclosure, the male input shaft of the gearmotor is fitted with a brake. This arrangement is greatly beneficial to a) hold the cover closed with the section ladders retracted on it or b) hold the cover at any positions between its first and second position with the section ladders either retracted on it, partly extended on it or fully extended on it.

In an embodiment of the disclosure, the mounting of the gearmotor near the aft end of the cover is greatly beneficial as it maximizes the torque generated by the cable around the pivoting axis of the cover, hence minimizes the required torque that the gearmotor has to produce to retract the section ladders on the cover and to close the cover.

In an embodiment of the disclosure, when the brake of the gearmotor is released and no electric power is applied to the gearmotor (i.e. the gearmotor is not energized), gravity forces only, at a speed controlled by the gear ratio of the gearmotor, open the cover at a controlled speed rather than a free fall, with the section ladders retracted on it, then the ladder sections start to extend at a controlled speed rather than a free fall. This is one of the major benefits of the disclosure over conventional ladder systems as no single mechanical failure can lead to a free fall.

In an embodiment of the disclosure, no mechanical single failure of the driving mechanism can lead to a dynamic opening of the cover and the extending of the ladder sections to the floor.

In an embodiment, when the electric circuit to the motorized system of the disclosure is energized, the brake releases the male input shaft of the motor thereby allowing the female output of the gearbox to rotate and drive the at least one engaged male shaft in either the clockwise or counterclockwise direction thereby causing the reel mounted on the male shaft to either windup or unwind the cable that drives the ladder sections and the cover to their first or second position.

The driving mechanism of the disclosure is particularly well adapted for application to an automatic extendable and retractable stairway that is installed on an access cover hinged on a framing structure that surrounds an opening to provide access to a space above or below an elevated structure. The stairway includes at least two distinct ladder sections that are engaged in a sliding arrangement. However, this is not limiting. It will be appreciated that, depending on the height of the ceiling, the number of ladder sections can be increased or decreased. In an embodiment of the disclosure, the stairway includes two sliding ladder sections. The first ladder section is fixed and mechanically attached to the access cover such that there is no relative movement between the access cover and the first fixed ladder section. The first sliding ladder section is arranged to slide, e.g., on top of the first fixed ladder section, and the second sliding ladder section is arranged to slide, e.g., on top of the first sliding ladder section. Mechanical extension and retraction stops are provided on each of the ladder sections for limiting their extending and retracting sliding travel.

In another aspect of the disclosure, there is provided a method of operating an automated ladder apparatus mounted on a cover and including a plurality of extendable sliding sections to provide access to a space above or below an elevated structure. The method includes a direct electrical control from a first toggle switch fitted to the structure supporting the stairway or from a second toggle switch installed in the room below and electrically connected to the first toggle switch or from a fully wireless control board that is supported by the cover. The operation of the apparatus via any of the two toggle switches or via the wireless system is totally independent.

In an aspect of the disclosure, there is provided a method of operating automated ladder apparatus mounted on a cover and including a plurality of ladder sections to provide access to a space above or below an elevated structure, the automated ladder apparatus including a pivotable cover for an opening in said elevated structure that is pivotable about a pivot axis; a motorized system comprising a gearmotor and an energizable brake, the motorized system being mounted on said pivotable cover such that the motorized system and the pivotable cover are movable in unison when the pivotable cover pivots about the pivot axis, said pivotable cover being pivotable between at least a first position to allow access to the space through the opening and a second position in which the cover substantially covers said opening; said motorized system is configured to retract one or more of the plurality of ladder sections on the pivotable cover, then to move the cover against the opening to close it; said motorized system is configured to pivot the pivotable cover so as to move the pivotable cover away from the opening, then to extend said one or more of the plurality of ladder sections away from the pivotable cover; said motorized system being coupled to at least one shaft fitted with at least one reel; said at least one reel coupled to at least one of said plurality of ladder sections via a cable to either (a) assist the pivotable cover to move away from the opening, then to extend said one or more of the plurality of sliding sections away from the cover, or (b) retract on the pivotable cover said one or more of the plurality of ladder sections then to move the pivotable cover against the opening to close it, or both (a) and (b); said gearmotor being coupled to the energizable brake; said energizable brake being configured to hold the pivotable cover over the opening to close the opening or to hold the pivotable cover immobile at any position in between the first and second positions; said gearmotor having a gear ratio sized to allow the opening of the pivotable cover under gravity only when the energizable brake is disengaged, the method comprising:

controlling a speed of extension of said one or more of the plurality of sliding sections away from the pivotable cover either by (a) energizing said gearmotor or (b) gravity only, wherein (a) energizing said gearmotor and (b) gravity only, each being capable of controlling said speed of extension of said one or more of the plurality of ladder sections away from the pivotable cover, and wherein the speed of extension of said one or more of the plurality of ladder sections away from the pivotable cover by gravity only is carried out when the motorized system is not energized and is determined by the gear ratio of the gearmotor.

Various aspects of the disclosure, in accordance with exemplary embodiments, together with further objects and benefits thereof, is more particularly described in the following detailed description taken in conjunction with the accompanying drawings.

DETAILED DESCRIPTION

Figure 1:
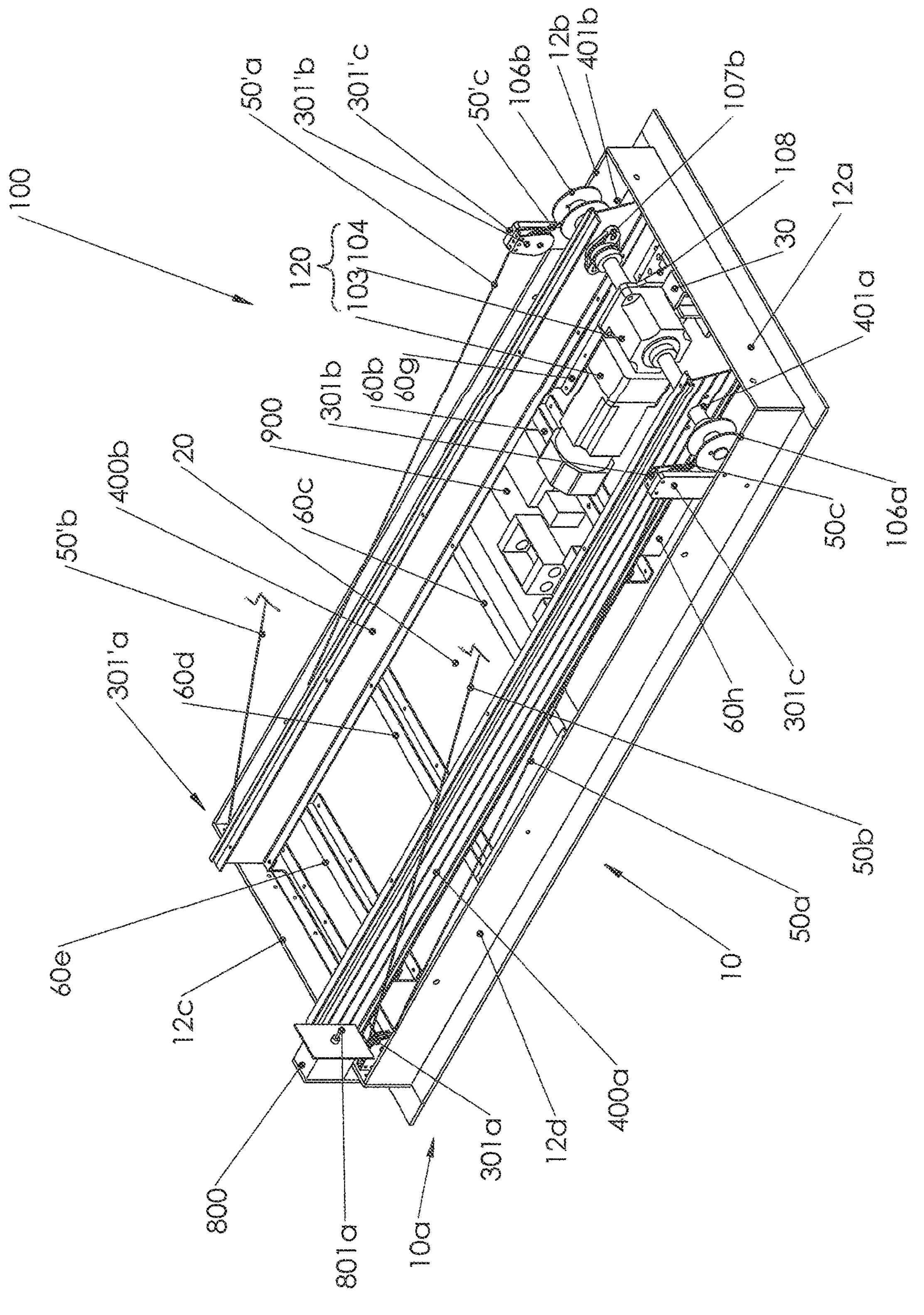
FIG. 1 is a perspective view of the access cover and actuation mechanism according to an embodiment of the disclosure, on its supporting structural frame, shown in its closed position.

In the following detailed description, reference is made to the accompanying drawings, which form a part hereof and are shown to illustrate specific embodiments in which the invention may be practiced. These embodiments are described in sufficient detail to enable those skilled in the art to practice the invention. It is understood that other embodiments may be utilized without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

FIGS. 1, 7, 8 and 8*a* show an embodiment of the stairway 1. The stairway 1 forms a single installable unit that includes all of the components and elements for its operation. The stairway 1 includes a supporting frame 10, a pivotable cover 20 on which is mounted a plurality of ladder sections 500, 600 and 700 (see also FIGS. 7, 8, 8*a*), a driving mechanism that comprises a motorized system 100 to control the pivoting of the cover 20 with the fixed ladder section 500 (see FIG. 7) and the ascent and descent of one or more of the sliding ladder sections 600 and 700, pulleys 301*a*, 301'*a*, 301*b*, 301'*b* and one or more cables 50, 50' (see also FIGS. 7, 8, 8*a*). The motorized system 100 is mounted on the pivotable cover 20 such that the motorized system 100 and the pivotable cover 20 are movable in unison when the pivotable cover 20 pivots about the pivot axis 10*a*. To facilitate understanding of the invention, the ladder sections 500, 600 and 700 have been omitted in FIGS. 1-4.

Figure 2:
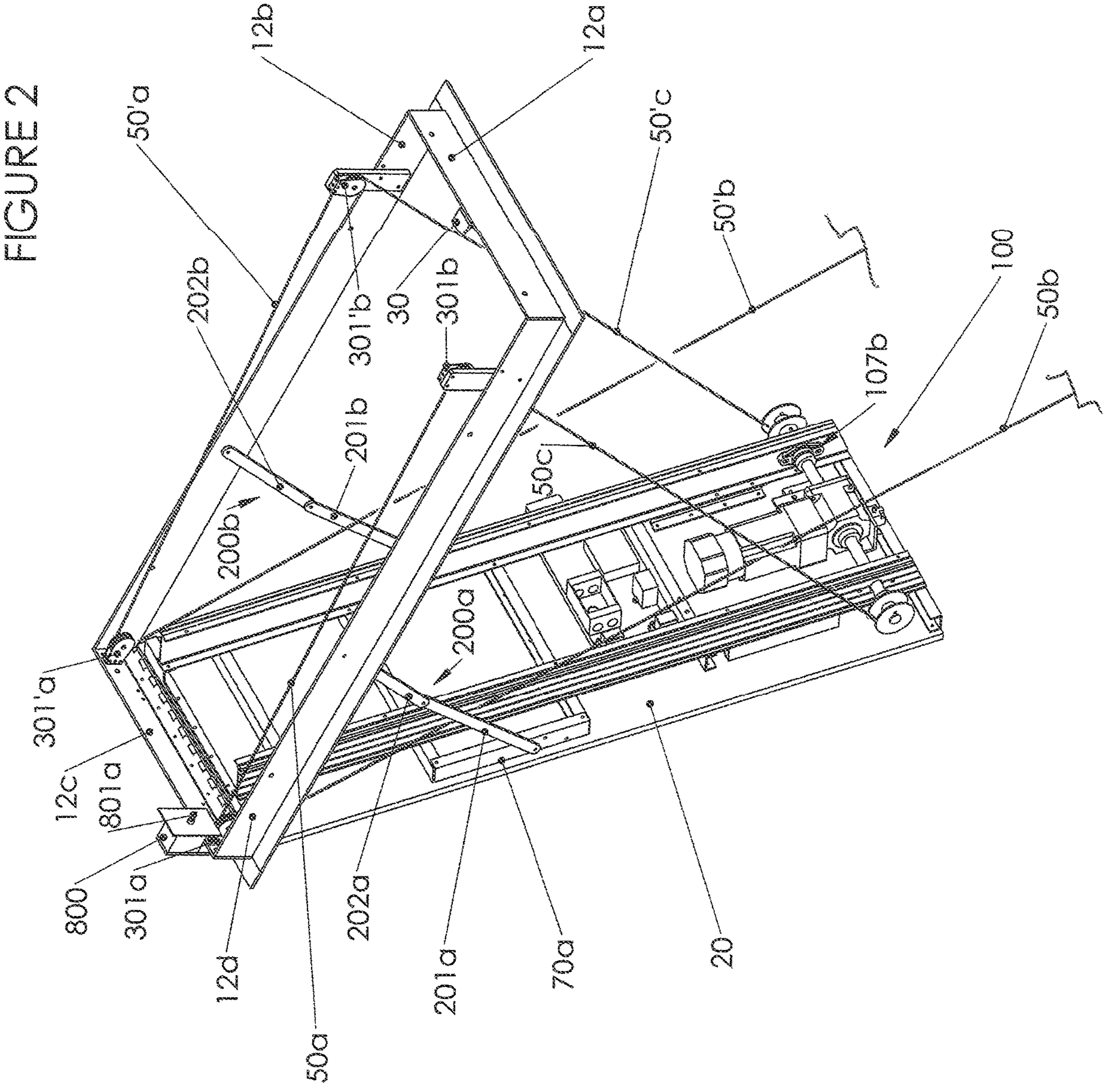
FIG. 2 is a perspective view of the access cover shown in its opened position according to an embodiment of the disclosure.
Figure 3:
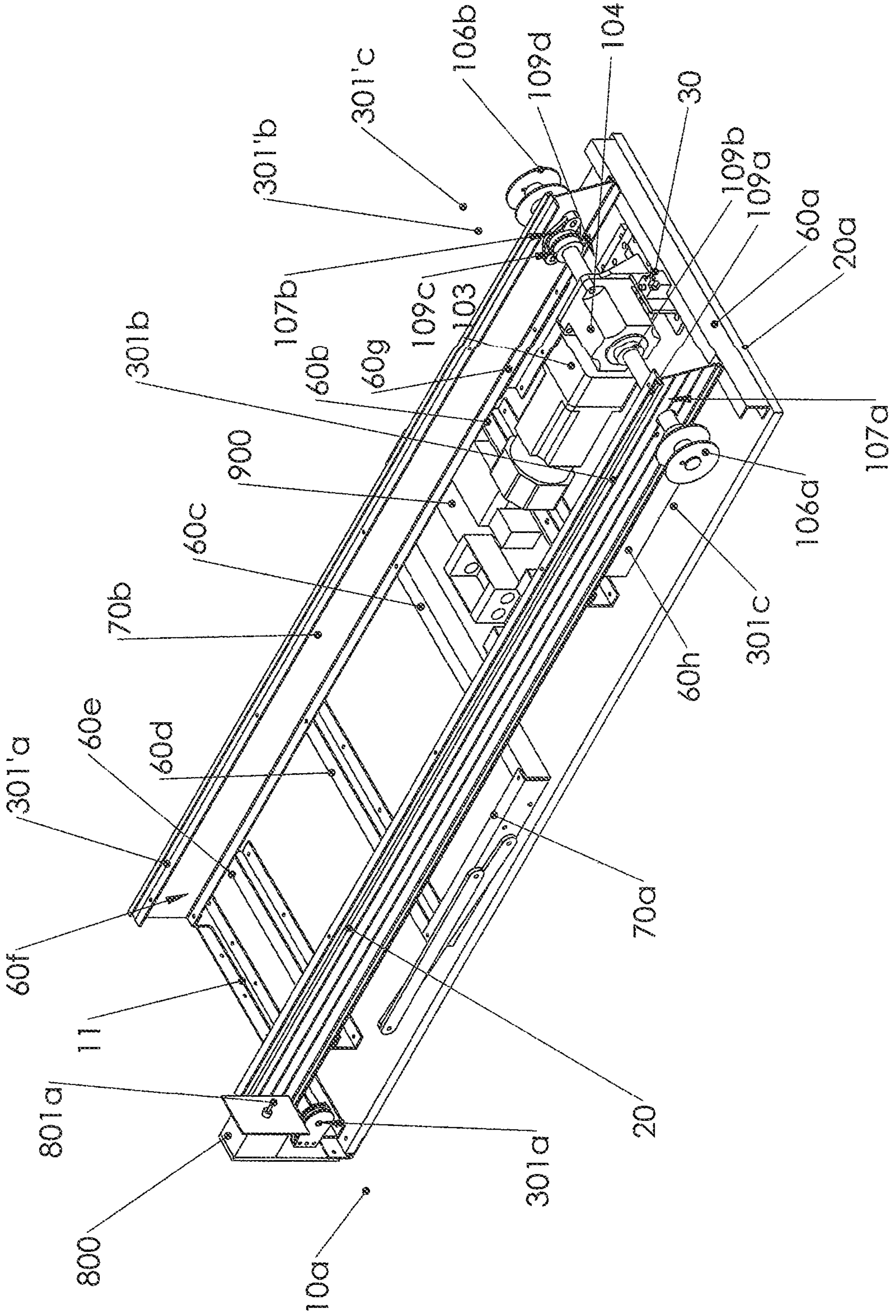
FIG. 3 is a perspective view of the access cover shown in FIG. 1, with the supporting frame and the two supports of the ladder fixed section removed according to an embodiment of the disclosure.
Figure 6:
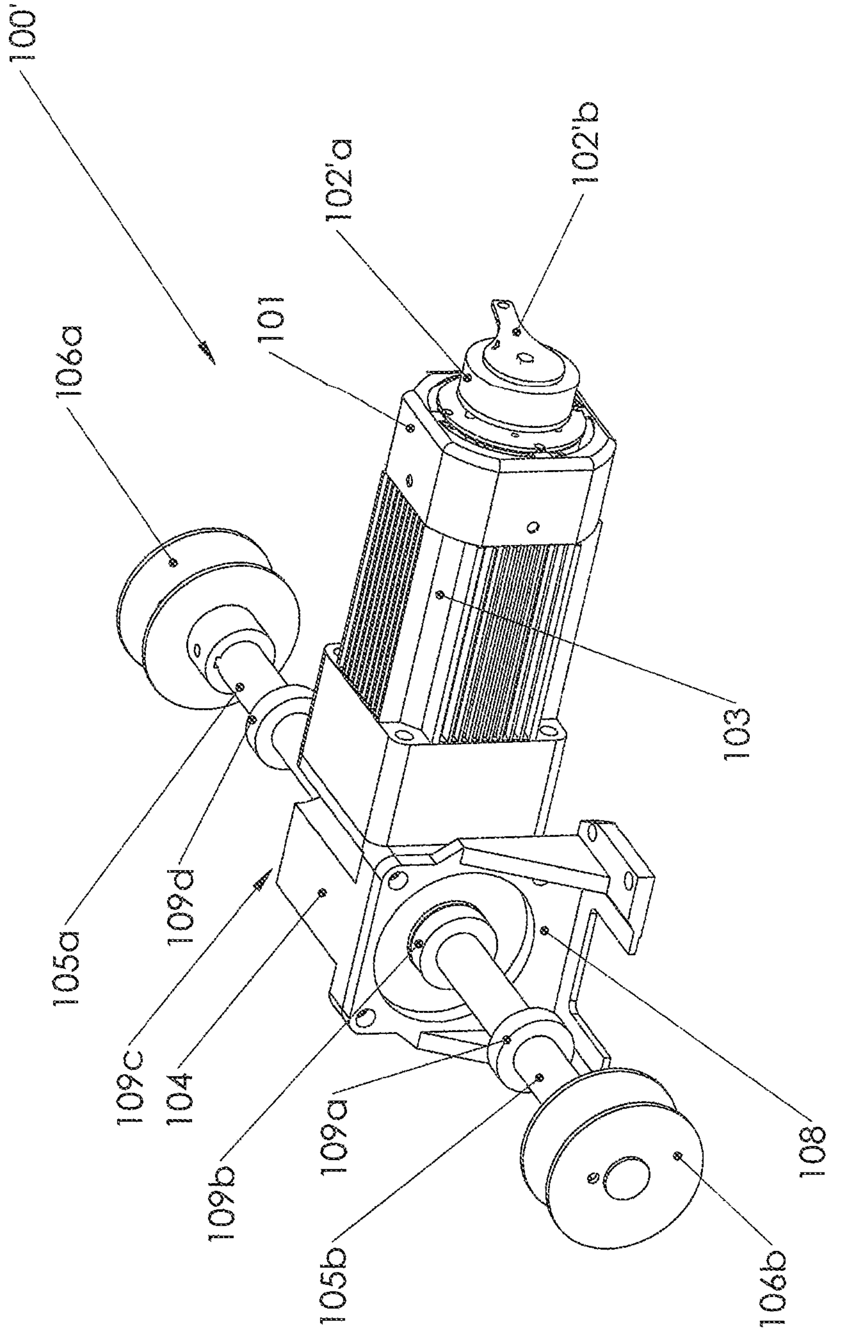
FIG. 6 is a perspective view of the actuation mechanism where the brake with manual release is located at the back end of the motor according to an embodiment of the disclosure.
Figure 7:
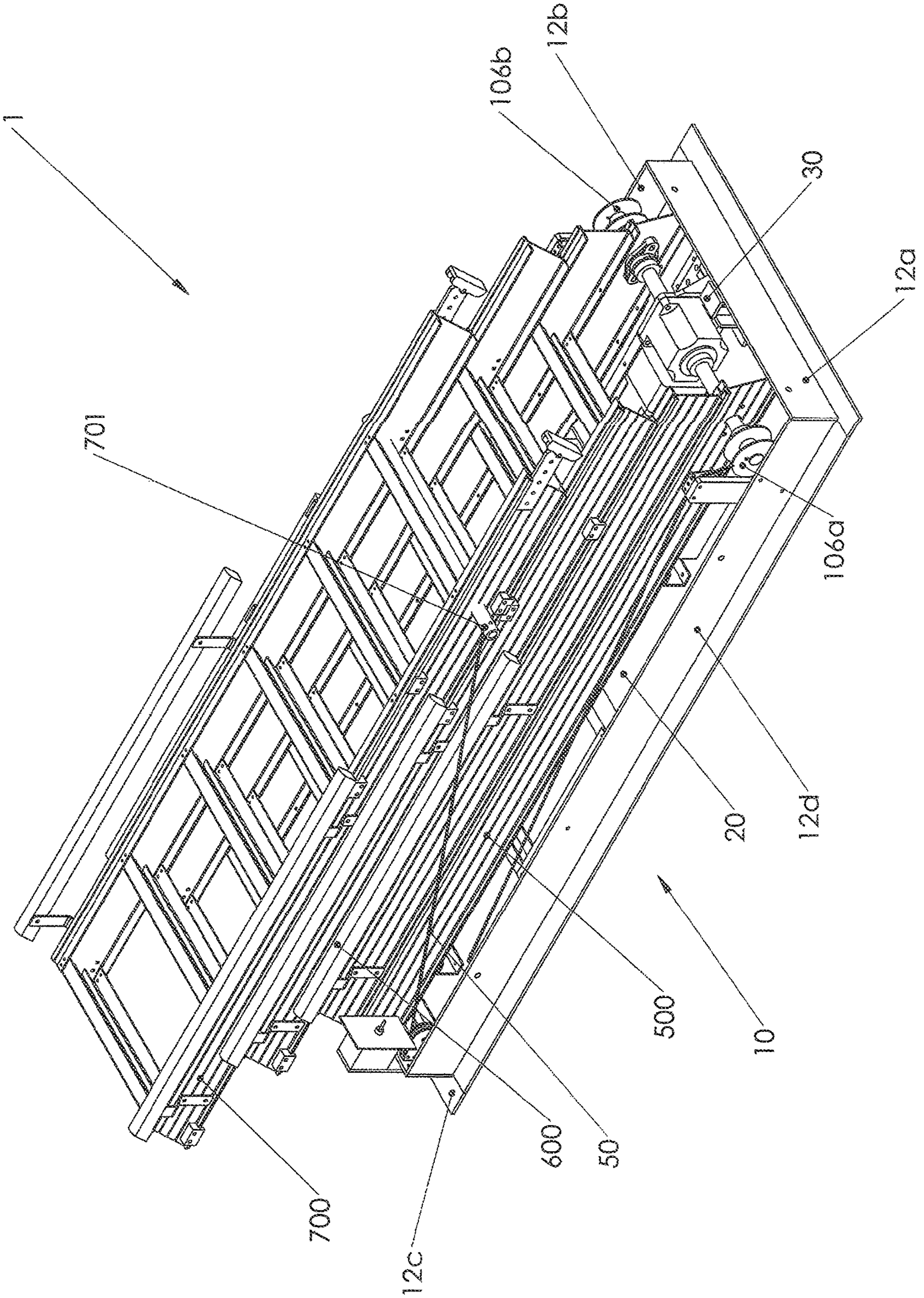
FIG. 7 is a perspective view of the access cover shown in FIG. 1 with the section ladders retracted on it according to an embodiment of the disclosure.

With reference to FIGS. 1, 2 and 3, the pivotable cover 20 is hinged on the pivot axis 10*a* on a supporting frame 10 via hinge system 11. In the embodiments of FIGS. 1-9, the supporting frame 10 has a rectangular shape and includes frames sections 12*a, b, c* and *d*. As shown in FIGS. 1, 7, the frame sections 12*a*-*d* surround the motorized system 100 and ladder sections 500, 600 and 700 when the pivotable cover 20 is in the closed position, namely when the ladder sections 500, 600 and 700 are fully retracted and the pivotable cover 20 closes the opening formed in the ceiling. The pivotable cover 20 and/or the support-covering frame 10 may be made of wood, metal, or composite material or any combination of these materials. Likewise, the ladder sections 500, 600 and 700 can also be made of metal, such as aluminum, steel, wood, or composite material or any combination of these materials. The pivotable cover 20 is configured and sized to at least partly cover, and in an embodiment fully cover, an opening defined in a ceiling to access an elevated structure above the ceiling. In an embodiment, the elevated structure is an attic space. However, it will be appreciated that the disclosed stairway can also be mounted to provide access to various types of elevated structures above the ceiling, such as a bedroom, loft, or an office space. It will be appreciated that the size and dimensions of the stairway 1 can vary in different embodiments of the invention depending on the height of the ceiling, the dimension of the opening in the ceiling and the width of the ladder sections 500, 600 and 700.

The supporting frame 10 is fixedly mounted to the elevated structure via the frame sections 12*a-d* using for example structural lag screws or any other structural nuts and bolts. In an embodiment, the supporting frame 10 is constructed and arranged to support a load up to 1,000 pounds. However, this is not limiting as the supporting frame 10 can be configured to support loads greater than 1,000 pounds in other embodiments of the disclosure. Moreover, in an embodiment, the pivotable cover 20 is constructed and arranged to support the ladder sections with its motorized system. For example, in an embodiment, the pivotable cover 20 may have a length dimension in a range of 54 to 70 inches, a width dimension in a range of 22 to 35 inches and a thickness in a range of 0.25 to 0.75 inches.

FIG. 1 shows the pivotable cover 20 in the closed position, which corresponds to the second position, while FIG. 2 shows the cover 20 in the opened position, which corresponds to the first position. In FIGS. 1, 3, section ladders supports 400*a*, 400*b* are structural beams that are mounted on cover 20 via a series of structural, for example C-channels 60 a, b, c, d, e, f, g, h attached to cover 20 and made of aluminum or any other structural materials. The structural beams 400 a, b support the fixed section 500 and act as spacer supports of the fixed ladder section 500. FIG. 7 shows the entire stairway 1 in its closed retracted position and including fixed ladder sections 500, and ladder sliding sections 600 and 700. FIGS. 1, 2, 3, 4, 7, 8, 8*a* and 9, show that the motorized system 100 is mounted on the pivotable cover 20.

Now referring to the motorized system 100, the motorized system 100 includes an energizable brake 102, a gearmotor 120 that includes a motor 103 and a gearbox 104, a dual shaft 105*a, b* and two reels 106*a*, 106*b* mounted on opposite ends of the shafts 105*a, b*. The male shaft 105*a, b* is supported by the female shaft 104*a* output of the gearmotor and by the bearings 107 a, b (FIGS. 1, 2, 3) respectively bolted to section ladders supports 400*a*, 400*b*. The female shaft 104*a* is arranged within the casing of the gearbox. The shafts 105*a, b* and the reels 106*a, b* may be made of aluminum, steel or other rigid material, such as carbon composite. By "rigid", it is meant a material that is configured to sustain the loads, efforts and torque generated by the cables 50, 50'*on* the shafts 105*a, b* and reels 106*a, b* during winding and unwinding of cables 50, 50'. The shafts 105*a, b* have substantially an equal length that depends on the width of the cover 20. For example, in an embodiment of the disclosure, the shafts 105*a, b* may have a length in the range of 10 to 15 inches and a diameter in the range of 0.75 to 1.25 inches. One end of each of the shafts 105*a, b* engages the female output 104*a* of the gearbox 104 and is substantially centered with respect to gearbox 104. No further description is provided as the connection to the gearbox 104 of the dual shafts 105*a, b* is very well known in the art. In the embodiment shown in FIGS. 3 and 4, the motorized system 100 is attached to the pivotable cover 20 via a gearbox mounting foot 108 that is bolted to the gearbox 104 and to the cover 20. The mounting foot 108 is sized to support the complete gearmotor and provide easy access for removal/installation of the motorized system of the invention. It will be appreciated that other types of mounting elements or supports could be used in other embodiments to mount the motorized system 100 on the pivotable cover 20. Furthermore, it will be appreciated that the pivotable cover 20 can take the form of a pivotable structural frame on which a decorative non-structural panel is attached. In this embodiment, the decorative non-structural panel does not support the weight of the motorized system. Instead, it is provided to cover the pivotable structural frame. The motorized system, section ladder supports and ladder section and other mechanical components could then be mounted on the pivotable structural frame.

Figure 4:
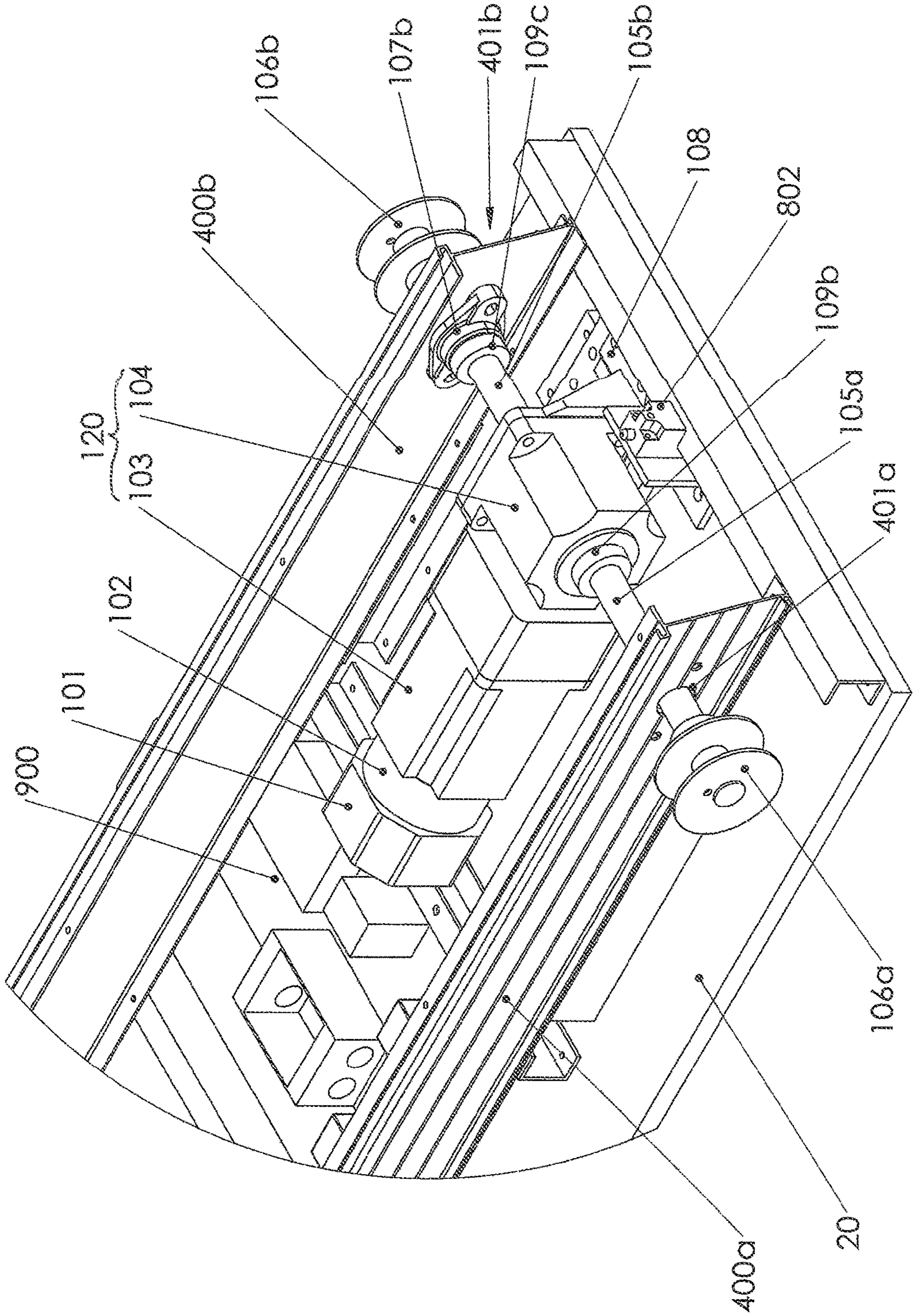
FIG. 4 is an enlarge perspective view of the gearmotor and brake mechanism according to an embodiment of the present disclosure.
Figure 5:
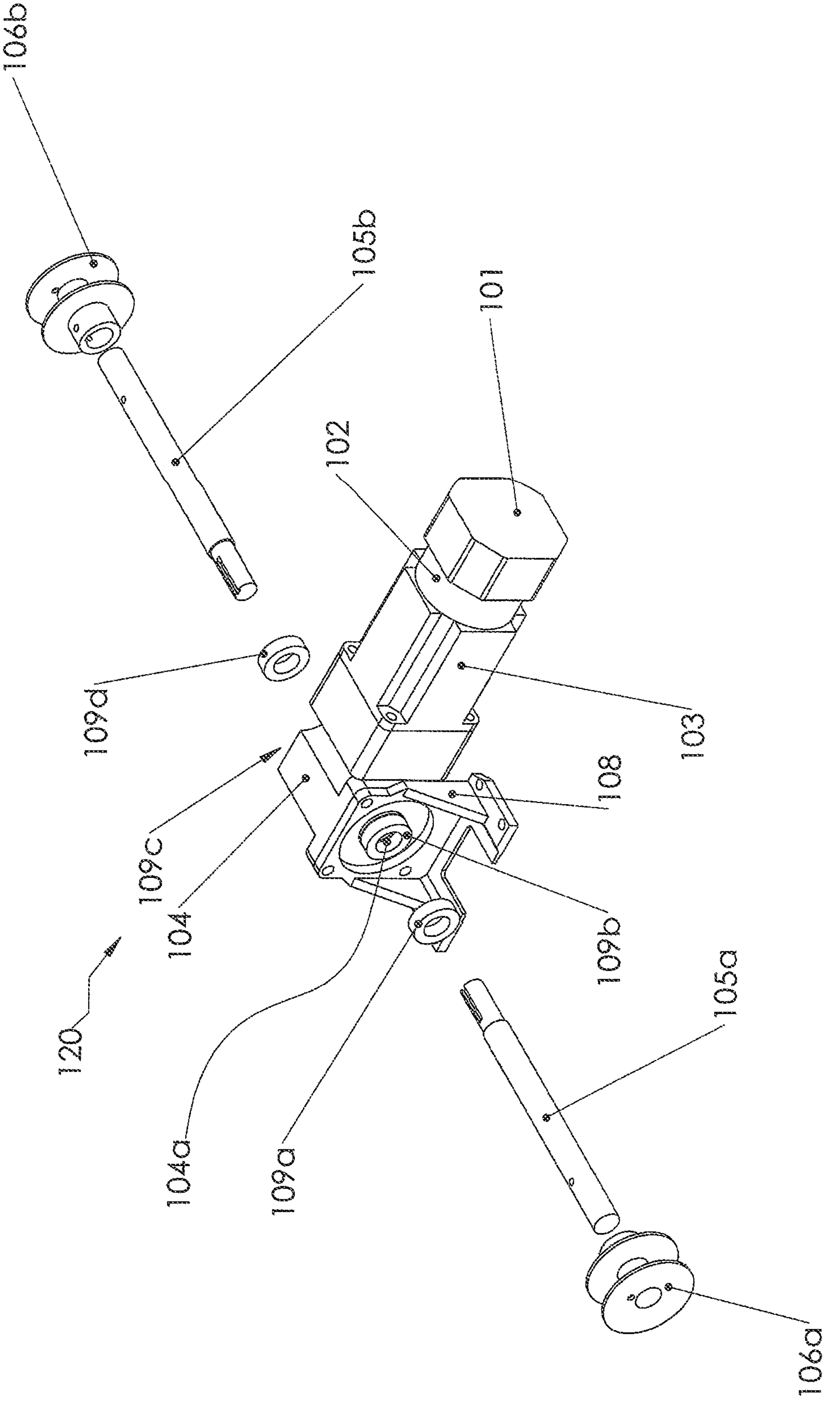
FIG. 5 is an exploded view of the actuation mechanism where the brake is located inside the motor according to an embodiment of the disclosure.
Figure 6A:
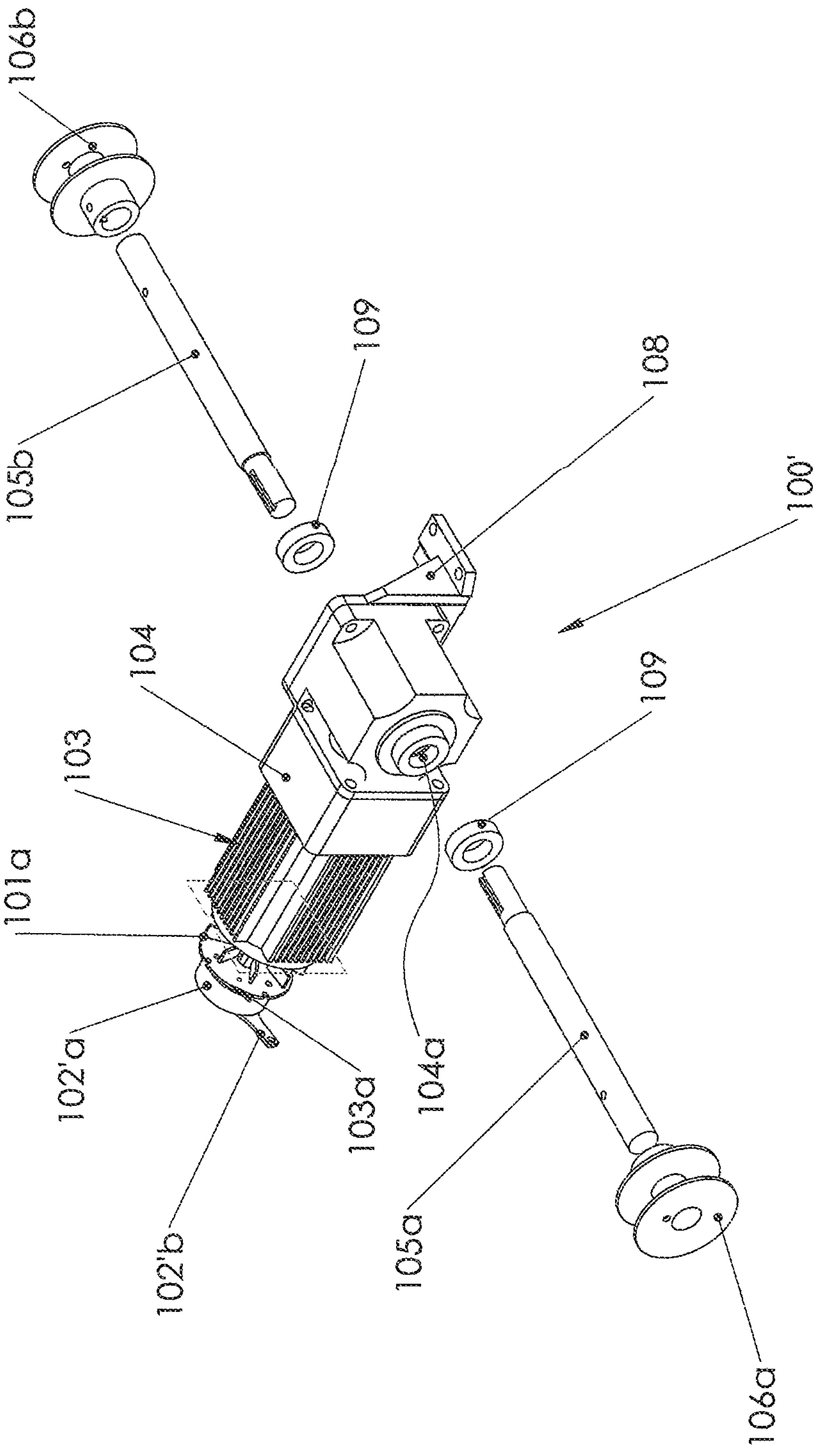
FIG. 6*a* is an exploded view of FIG. 6 with the fan cover removed.

With reference to FIGS. 4 and 5, which show various views of the motorized system 100, the motor 103 is fitted on its aft end with a brake cover 102, a fan cover 101 and on its forward end with the gearbox 104. Underneath the brake cover 102 and the fan cover 101 is a brake (not shown) and a fan (not shown) that are mounted on the male input shaft of the motor similarly to exploded view of motorized system 100'*of* FIG. 6*a*. In the exploded view of FIG. 5, the male input shaft (not shown) of motor 103 supports the brake and the fan (cover only shown). As this type of gearmotor with internal brake is well known in the art, no further description is made. With reference to FIGS. 6, 6*a*, the male input shaft 103*a* of the gearmotor of motorized system 100' is fitted with a fan 101*a* and a brake 102'*a*. The brake 102'*a* has a manual release lever 102'*b*. Since this type of gearmotor with manual brake release is well known in the art, no further description is made. In an embodiment, the motor is configured to provide a torque output of 70 to 140 lb.in, such as, for example, from 80 to 130 lb.in. and in an embodiment from 90 to 120 lb.in. In an embodiment shown in FIGS. 3, 4 and 5, the gearbox 104 is of the right-angle type with a hollow female shaft 104*a* output for engagement of male shafts 105*a*, 105*b*. The gearbox 104 is supported by a foot fitting 108 that is fastened to the cover 20 via a plurality of fasteners (not shown). The male shafts 105 a, b are configured to extend through an opening 401*a* provided in ladder support 400*a* of fixed ladder section 500 and through opening 401*b* provided in ladder support 400*b* of fixed ladder section 500. The shafts 105*a*, 105*b* are supported by respective bearings 107*a, b* (FIG. 3) and are fitted with collars 109*a*, 109*b*, 109*c* and 109*d* for locking the shafts 105*a*, 105*b* in the axial direction X-X during rotation of the shafts 105*a*, 105*b* by the motor 103. Each end of the shafts 105*a*, 105*b* is fitted with respective reels 106*a*, 106*b* on which, with reference to FIGS. 1, 2, 78, and 8*a*, at least a respective cable 50, 50' winds-up or unwinds for driving the cover 20 to either its first or second position. In an embodiment, the cables 50, 50' are made of steel or nylon with a minimum breaking load of, for example, 750 pounds per cable. The length of the cables 50, 50' is selected to permit the cables to extend the sliding ladder sections 600 and 700 sufficiently to provide access to the ceiling. In an embodiment of the disclosure, at least one of the cables 50, 50' is directly driven by the single motorized system 100. Therefore, it will be appreciated that there is no need for the single motorized system 100 to drive a secondary shaft via sprockets/gears/chain/and/or belt or via any other means as is done in conventional systems. A great benefit of the arrangement of the motorized system of the present disclosure is that no single mechanical failure can lead to a potential dynamic opening of the cover 20 with its ladder section(s) on it. Another benefit of the motorized system of the instant disclosure is that the reaching to the floor of the last ladder sliding section is not dictated by its weight, as is in previous art. This is the result of the driving mechanism designed to drive also the reels in the unwinding direction, while controlling the speed of gravity, and not only in regulating the speed of gravity as is in prior art. The motorized system of the instant disclosure drives the male shafts/reels in the winding and unwinding directions and also regulates the speed of gravity in the unwinding direction.

Figure 8:
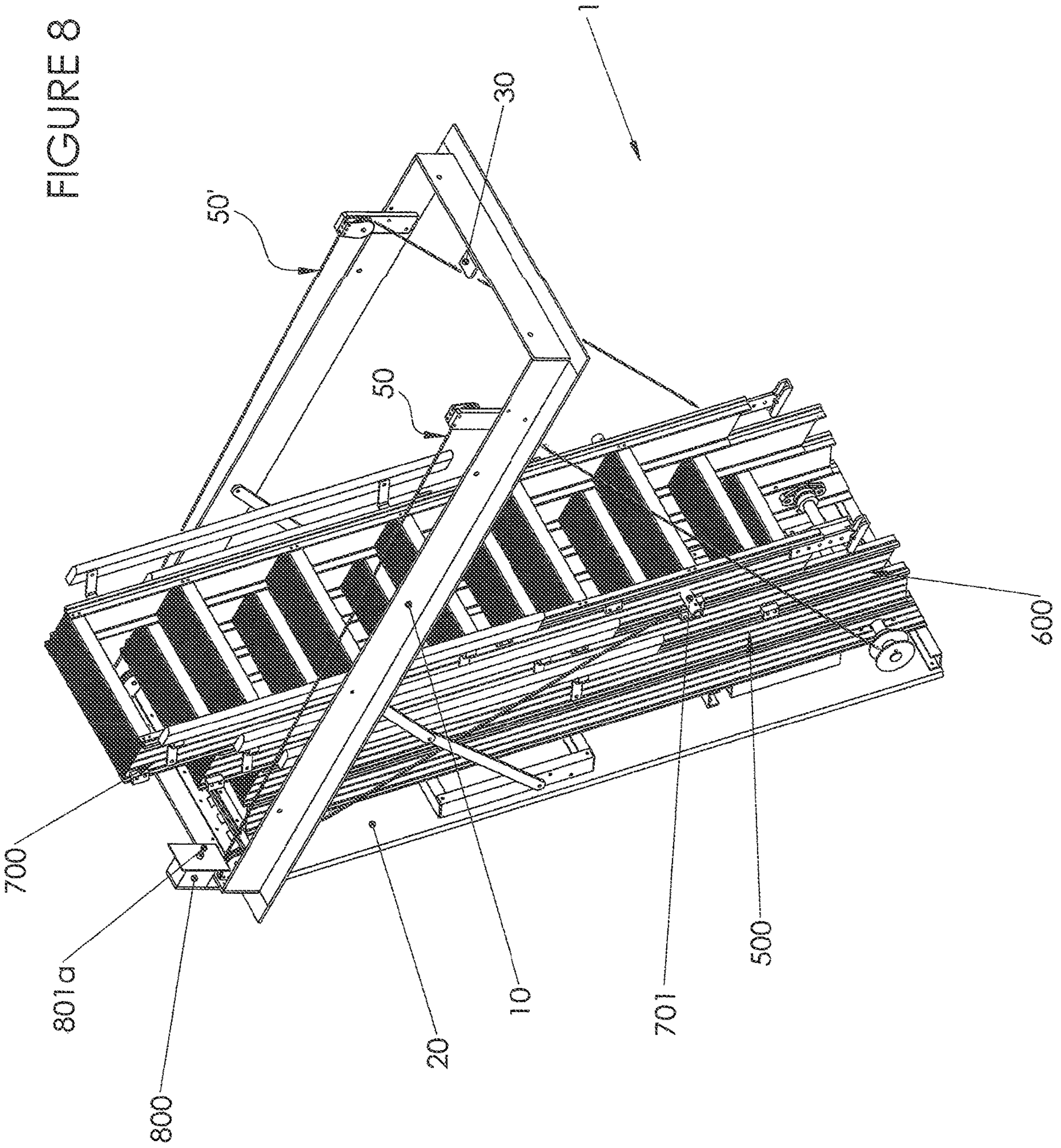
FIG. 8 is a perspective view of the access cover shown in FIG. 2 with the section ladders retracted on it according to an embodiment of the disclosure.
Figure 8A:
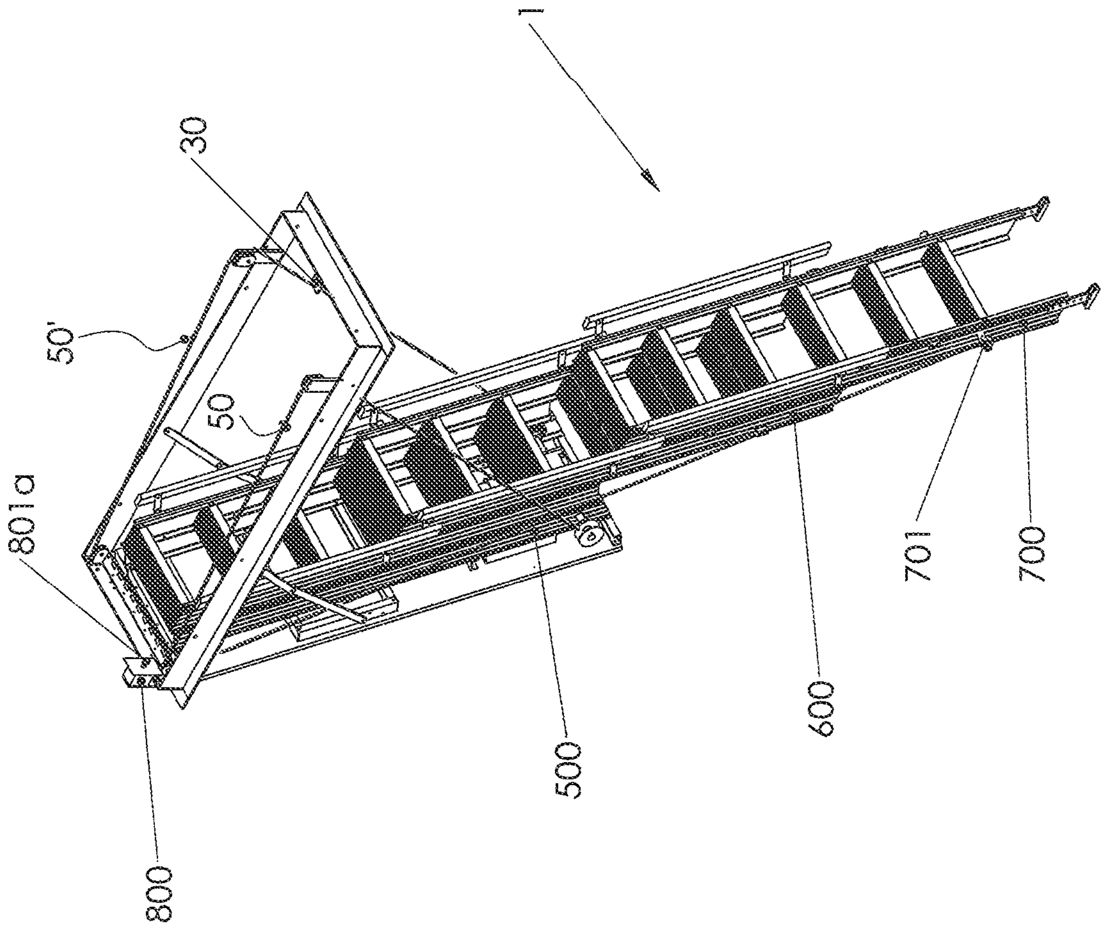
FIG. 8*a* is a perspective view of the access cover shown in FIG. 2 with the section ladders extended on it according to an embodiment of the disclosure.
Figure 9:
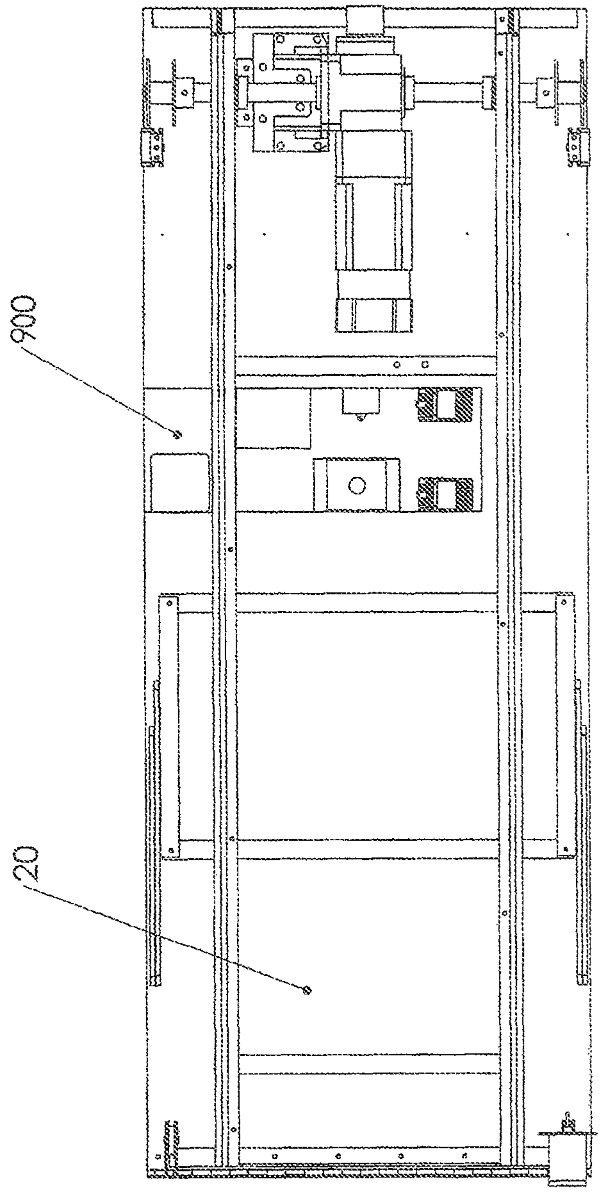
FIG. 9 is a top view of the access cover shown in FIGS. 1,3 with a wireless control board on it according to an embodiment of the disclosure.

Referring back to FIGS. 2 and 3, the stairway 1 further comprises two arm mechanisms 200*a*, 200*b* that each connect the pivotable cover 20 to the supporting frame 10. The arm mechanisms 200*a*, 200*b* each include a first portion 201*a*, 201*b* that is pivotably connected to, respectively, longitudinal supporting structural frame arm 70*a*, 70*b* and a second portion 202*a*, 202*b* that is pivotably connected to frames 12*d*, 12*b* of supporting frame 10. During opening of the stairway 1, arm mechanisms 200*a*, 200*b* pivot relative to each other and limit (as shown in FIGS. 2, 8, 8*a*) the maximum opening angle of the pivotable cover 20 relative to the horizontal direction.

With reference to FIG. 5, the motorized system 100 is fitted on its aft side with a brake cover 102 and a fan cover 101. Underneath the fan cover 101 is a fan similar to fan 101*a* depicted in FIG. 6*a*. The fan is configured to supply a flow of air to the motorized system 100 during use so as to prevent overheating of the motor 103 of the motorized system 100. In this embodiment, the brake 102 is an electromagnetic brake. The brake 102 is engaged when electric power to the motorized system 100 is OFF and is released when electric power to the motorized system 100 is ON. In this embodiment, the brake 102 can only be released electrically. Since this type of electromagnetic brake is very well known and used in the industry no further description is made.

FIG. 6 shows another embodiment of the motorized system 100'. The difference between the motorized system 100 of FIG. 5 and the motorized system of FIG. 6 is that, in FIG. 6, the motorized system 100' is fitted on its aft side with an electromagnetic brake 102'*a* with manual lever release 102'*b*. The electromagnetic brake 102'*a* is engaged when electric power to the motorized system 100' is OFF and is released when the electric power to the motorized system 100' is ON. The electromagnetic brake 102'*a* can also be released manually by moving the lever 102'*b* from its engaged position to its released position. The manual release feature of the electromagnetic brake 102'*a* is of a particular interest since it allows releasing of the electromagnetic brake 102'*a*, hence opening of the panel 20 even for the case of electrical failure. Since this type of electromagnetic brake 102'*a* is very well known and used in the industry no further description is made.

With reference to FIGS. 5 and 6*a*, the motorized system 100, 100' of the various embodiments of the disclosure is fitted with a fan 101*a* (fan cover only shown in FIGS. 5, 6). While the purpose of the fan 101*a* is to cool down the electric motor 103 during its operation, without departing from the spirit of this invention the motorized system 100, 100' may not include a fan.

When the cover 20 is in its closed position, its second position, the electrical power to the motorized system 100, 100' is OFF and consequently the brake 102 or 102'*a* is engaged, which then maintains the cover 20 closed. In one or more embodiments, an optional locking system can be further provided to lock the cover 20 to one of the frame sections 12*a-d*, such as frame section 12*a* when the cover 20 is in its closed position. The optional locking system may be electrically actuated and may include a first part attached to supporting structure 60*a* and a second part attached to frame section 12*a*. The first part and the second part are configured to cooperate with each other to lock and unlock the cover 20 to the supporting frame 10. No further description of the optional locking system as it is known in the art.

In case of unwanted release of the electromagnetic brake 101 caused by a mechanical or an electrical failure of the electromagnetic brake 102 or 102'*a* while the cover 20 is closed and in the event there is no other locking system or the other locking system is deactivated due to an unwanted mechanical or electrical failure, then the cover 20, under gravity forces, is specifically configured to open at a low speed as the speed rate is controlled by the gear ratio of the gearbox 103 of the motorized system 100, 100' which directly controls the spinning rotational speed of the shafts 105*a*, 105*b* hence the reels 106*a, b*. In one or more embodiments, the gearbox 104 is constructed so as to provide a gear ratio in the range of 1/40 to 1/15. In an embodiment of the disclosure, the gear ratio is in the range from 1/38 to 1/18, such as from 1/35 to 1/20 and in an embodiment from 1/30 to 1/25. It will be appreciated that this is not limiting and that the gear ratio can be greater than 1/15 and lower than 1/40 depending on the size and masse of the stairway 1, including the ladder sections and cover 20 with its motorized system on it. This results in an opening of the cover with the section ladders retracted on it then the starting of the descent of the ladder sliding sections 600, 700 at a sliding rate that is governed by the rotational speed or rpm (rotations per minute) rate of the reels 106*a*, 106*b*. In an embodiment of the disclosure, the speed of opening of the cover and extension of the sliding ladder sections 600, 700 correspond to a rotational speed of the reels 106*a*, 106*b* of about from 60 to 100 rotation per minute (rpm). In an embodiment, the rotational speed of the reels 106*a*, 106*b* is from 70 to 110 rpm. The term “about” described herein is intended to cover variation of +/−20%. It will be appreciated that this is not limiting and that the rotational speed can be greater than 110 rpm and lower than 70 rpm depending on the size and masse of the stairway 1, including the ladder sections and cover 20. Because the male shafts 105*a, b* are directly driven by the female shaft 104*a* of the gearmotor, at a control speed, this explains why, a single mechanical failure, of the motorized system 100, 100' of the present disclosure cannot lead to a dynamic opening of the cover 20. This is a great benefit of the motorized system 100, 100' configuration of this disclosure as it directly controls and drives the opening speed of the cover with the section ladders retracted on it, then the sliding descent of the ladder sections 600, 700. Consequently, and because the shafts 105*a*, 105*b* are directly driven by the gearbox female output, hence the rotational output speed of the shaft is controlled by the gear ratio of the gearmotor, there is no single mechanical failure of the motorized system of the invention that can lead to a dynamic, hence potentially catastrophic unwanted opening of the cover with the section ladders on it.

With reference to FIGS. 1, 2, 3, 7, 8 and 8*a* the motorized system 100 directly controls the winding or unwinding of the cables 50, 50' on the reels 105*a, b* via pulleys 301*a*, 301*b*, 301'*a* and 301'*b*. In an embodiment, pulley 301*a* and 301'*a* are mounted on the interior side of frame section 12*c* in the vicinity of pivot axis 10*a* of the cover, whereas pulleys 301*b* and 301'*b* are mounted on the interior side of frame sections 12*d*, 12*b* via respectively pulley supports 301*c* and 301'*c*, in the vicinity of frame section 12*a*, i.e., far away from the pivot axis 10*a* of cover 20. The term “vicinity” here in the recitation “in the vicinity of pivot axis 10*a*” is intended to indicate that the distance between the pivot axis 10*a* and the pivot axis of each of the pulleys 301*a*, 301'*a* is less than 10 inches, for example less than 5 inches, for example less than 3 inches, for example less than 2 inches and in an embodiment about 1 inch (+/−10%). The term “vicinity” here in the recitation “in the vicinity of frame section 12*a*" is intended to indicate that the distance between pulleys 301*b*, 301'*b* and frame section 12*a* is less than 25% of the entire longitudinal length of the pivotable cover 20, such as for example less than 20% of the entire longitudinal length of the pivotable cover 20 or less than 15% of the entire longitudinal length of the pivotable cover 20 and in an embodiment less than 10% of the entire longitudinal length of the pivotable cover 20. The positioning of pulleys 301*b*, 301'*b*, with reference to the pivot axis 10*a* of the cover 20, is a great benefit to the disclosed motorized system as it minimizes the output torque that the gearmotor has to generate for operating the apparatus of the invention.

One end of cable 50, 50' is attached to, respectively, the reel 106*a, b* (FIGS. 1, 2, 7, 8 and 8*a*) while the other end is attached in the vicinity of each end of a tow bar 701, (FIGS. 7, 8, 8*a*) that is part of the most upper sliding ladder section of the stairway. In FIGS. 7, 8, 8*a*, the upper sliding ladder section corresponds to sliding ladder section 700. With reference to FIGS. 1, 2, 7, 8 and 8*a*, the cable 50 has three distinct parts referenced as 50*a*, 50*b* and 50*c*. Likewise, cable 50' has three distinct parts referenced as 50'*a*, 50'*b* and 50'*c*. Each part of the cables 50, 50' fulfills distinct functions. Part 50*a* and part 50'*a* of, respectively, cable 50 and cable 50'stay at a constant length and have a guiding function on pulleys 301*a*, 301*b*, 301'*a*, 301'*b* (FIGS. 1, 2, 7, 8, 8*a*), part 50*b* and part 50'*b* of, respectively, cable 50 and cable 50' has a pulling function of the section ladders 600, 700 to retract them over the pivotable cover 20 (FIGS. 7, 8) or a retaining function when the ladder sections slide to extend on cover 20 and part 50*c* and 50'*c* of, respectively, cable 50 and cable 50' have a pulling function of the cover 20 with the fixed section ladders 500, and the ladders section 600 and 700 retracted on it (FIGS. 7, 8). Each of cables 50 and 50' is supported by at least 2 pulleys 301*a* and 301*b*, respectively 301'*a*, 301'*b* (FIGS. 1, 2, 3, 7, 8) attached to supporting frame 10. However, this is not limiting. It will be appreciated that additional pulleys could be used in other embodiments to connect the cables 50, 50' from the reels 106*a*, 106*b* to each end of the tow bars 701, provided on the upper ladder section (upper sliding ladder section 700 in FIG. 7).

It will be appreciated that the disclosed arrangements in FIGS. 1-8*a* are particularly beneficial because the particular arrangement of the reels 106*a*, 106*b* and the pulleys 301*b*, 301'*b* (FIGS. 1, 2, 7, 8 and 8*a*) provide the maximum moment arm i.e., the distance between part 50*c* 50'*c* of respectively cable 50, 50' and pivot axis 10*a* of cover 20. This is the consequences of the shaft 105*a, b* of the motorized system 100, 100' being located at substantially the aft end of cover 20, and the pulley 301*b*, 301'*b* being located on supporting frame 10 substantially opposite pivot axis 10*a* an close to the shaft 105*a, b*. That is, as shown in FIGS. 1-8, the motorized system 100, 100' is provided such that the shaft 105*a, b* is provided in the vicinity of the aft end of pivotable cover 20. With this arrangement, parts 50*a*, 50'*a* of cables 50, 50' extend over substantially the entire length of the cover 20. By "vicinity" it is meant that the shafts 105*a, b* are provided at a distance from the edge 20*a* (FIG. 3) of cover 20 that is less than 15% of the entire longitudinal length of the cover 20, such as for example less than 10% of the entire longitudinal length of the cover 20. This positioning of the shafts 105*a, b* and motorized systems 100, 100' minimizes the torque generated by the portion 50*c*, 50'*c* of cables 50, 50' on the reels 106*a*, 106*b* of the motorized system 100, 100'. Another benefit of maximizing the moment arm for closing the cover 20 with its section ladders retracted on it is that it allows minimizing the output torque that the motorized system 100 or 100' needs to provide to bring the cover 20 and sections ladders 500, 600, 700 from the first position to the second position. This results in lowering the cost of the motorized system of the instant disclosure.

With reference to FIGS. 7, 8, 8*a*, the ladder sections 500, 600, 700 are configured to allow a longitudinal sliding motion between each other. Ladder section 500 is fixed and mechanically attached to cover 20 and spaced from it by plurality of spacers 60*a*, 60*b*, 60*c*, 60*d*, 60*e*, 60*f*, 60*g*, 60*h* and 400*a, b* (FIGS. 1, 3). Sliding ladder section 600 is engaged with fixed ladder section 500 and is configured to slide longitudinally on top of fixed ladder section 500. Sliding ladder section 700 is engaged with ladder section 600 and is configured to slide longitudinally on top of ladder section 600. No further description of the sliding arrangement is made as this is a known art used in the industry.

It will be appreciated that the various aspects of the disclosure use only the motorized system 100 or 100' to open the cover 20 then extend the ladder sections on it or retract the ladder sections on the cover then close the cover 20. There are no single mechanical failures that can lead to a dynamic opening of the cover with the sliding sections on it.

In one or more embodiments of the disclosure, the motorized system 100, or 100' is connected to a standard 110-120 vac power outlet provided in the elevated structure. The wire leads (not shown) of the motorized system are routed on the cover 20 from the motor 103 to the junction box 800 (FIG. 1). The junction box connects directly to the 110-120 vac power outlet of the elevated structure. The junction box 800 is fitted with a Double Pole-Double Throw momentary (DPDT) toggle switch 801*a* (FIGS. 1, 2, 3), DPDT switch well known in the art. The switch is spring loaded in the neutral position hence electric power is removed. Flipping/holding the switch in the UP or DOWN direction energizes the brake and gearmotor for operation of the extendable and retractable Stairway. With reference to FIG. 4, the cover supports a limit switch 802 which purpose is to switch off electric power to the motorized system 100, 100' when, and only when, the cover 20 is fully closed with the section ladders retracted on it. Toward the end of the UP transit of the stairway, the cover 20 brings the switch 802 in contact with the switch target 30 (FIGS. 1, 2, 3, 7, 8, 8*a*) fitted to frame 12*a* of substantially rectangular frame 10 (FIGS. 1, 2, 3, 7, 8, 8*a*). The limit switch 802 is a Double Pole Single Throw (DPST) switch. It only turns off the electric power to the motorized system when the cover is fully closed, even if the operator of the apparatus continues to hold the toggle switch in the up direction. Because the limit switch has no function for the down travel of the apparatus, as soon as the operator of the ladder flips/holds the toggle in the downwards direction, the apparatus starts its transit down. As this is well known in the art no further description is made.

The motorized system may further include an electrical circuit for wireless control of the opening of the cover with the section ladders retracted on it then the extending of the sliding sections to the floor. The circuitry also controls the retraction of the ladder sections on the cover then the closing of the cover. The board 900 (FIG. 9) supporting the circuitry is installed on the cover 20 and includes standard electric/electronic components such as a receiver, electronic or electromechanical relays and any other necessary components. The circuitry is electrically connected directly and in parallel to the circuitry of the gearmotor, the brake and to the limit switch 802. In this manner so that the stairway can be either operated from the toggle switch or from the remote transmitter the motorized system 100, 100' can be remotely controlled via a remote control to energize the brake 102, 102'*a*, the motor 103 and rotate the shaft 105*a,b* in the clockwise or counterclockwise direction to enable winding or unwinding of the cables 50, 50'.

In operation, cover 20 can be rotated and opened and sliding ladder sections 600 can be extended in accordance with different embodiments. In a first embodiment of the disclosure, the operator of the stairway 1 activates a first switch (e.g. of a remote control unit or a wall unit) to supply electrical power to the motorized system 100, 100' (brake 102, 102' and motor 103), which disengages the brake 102, 102' and energizes the motor 103 to control opening of the cover 20 and extension of the sliding ladder sections 600, 700 away from the cover 20 at a controlled speed. In this first embodiment, the motorized system 100, 100' (brake 102, 102' and motor 103) is fully energized to regulate the speed of gravity and control rotation of the shafts 105*a*, 105*b* via the gearbox 104. In a second embodiment, the operator of the stairway 1 can activate a second switch (e.g. of a remote control or a wall unit) to solely disengage the brake 102, 102' but without energizing the motor 103. In the second embodiment, when the brake 102, 102' is released and no electric power is applied to the motor 103 (i.e. the motor 103 is not energized), gravity forces only, at a speed controlled by the gear ratio of the gearmotor, open the cover 20 with the sliding ladder sections retracted on it, then the ladder sections start to extend away from the cover 20 at a controlled speed rather than a free fall. This is one of the major benefits of the disclosure over conventional ladder systems as no single mechanical failure can lead to a free fall. Moreover, in a third embodiment, and in the event no electrical power is supplied to the motorized system, the operator can release the manual release lever of the brake 102', which in turn manually releases the brake 102, 102', and enables the cover 20 to rotate and the sliding ladder sections to extend away from the cover 20 by gravity only in a similar manner as in the second embodiment. It will be appreciated that the manual release lever of the brake 102' can be remotely and mechanically activated in various embodiments of the disclosure. In operation, when the stairway 1 should be closed, the operator can activate a third switch (e.g. of a remote control unit or a wall unit) to supply electrical power to the motorized system 100, 100' (brake 102, 102' and motor 103), which energizes the motor 103 to retract the sliding ladder sections 600, 700 on the cover 20 and rotate the cover 20 to close the opening. When electrical power is no longer supplied to the motorized system 100, 100', the brake 102, 102' are engaged, which blocks rotation of the shafts 105*a, b*.

It will be appreciated that the various embodiments and aspects of the disclosure described previously are combinable according to any technically permissible combinations. For example, various aspects of the present disclosure may be used alone, in combination, or in a variety of arrangements not specifically described in the embodiments described in the foregoing and is therefore not limited in its application to the details and arrangement of components set forth in the foregoing description or illustrated in the drawings. For example, aspects described in one embodiment may be combined in any manner with aspects described in other embodiments. Having described above several aspects of at least one embodiment, it is to be appreciated various alterations, modifications, and improvements will readily occur to those skilled in the art. Such alterations, modifications, and improvements are intended to be object of this disclosure. Accordingly, the foregoing description and drawings are by way of example only.

I claim:

1. An automated ladder apparatus mounted on a cover and including a plurality of ladder sections to provide access to a space above or below an elevated structure, the automated ladder apparatus comprising:

a pivotable cover for an opening in said elevated structure that is pivotable about a pivot axis;

a motorized system comprising a gearmotor and an energizable brake, the gearmotor comprising a single motor and a gearbox, the motorized system being mounted on said pivotable cover such that the motorized system and the pivotable cover are movable in unison when the pivotable cover pivots about the pivot axis, said pivotable cover being pivotable between at least a first position to allow access to the space through the opening and a second position in which the pivotable cover substantially covers said opening;

said motorized system is configured to retract one or more of the plurality of ladder sections on the pivotable cover, then to move the pivotable cover against the opening to close it;

said motorized system is configured to pivot the pivotable cover so as to move the pivotable cover away from the opening, then to extend said one or more of the plurality of ladder sections away from the pivotable cover;

said motorized system being coupled to at least one shaft directly mounted with at least one reel, said at least one shaft being directly driven by and aligned with an output shaft of the gearbox;

said at least one reel coupled to at least one of said plurality of ladder sections via a cable to either (a) assist the pivotable cover to move away from the opening, then to extend said one or more of the plurality of ladder sections away from the pivotable cover, or (b) retract on the pivotable cover said one or more of the plurality of ladder sections then to move the pivotable cover against the opening to close it, or both (a) and (b);

said gearmotor being coupled to said energizable brake;

said energizable brake being configured to hold the pivotable cover over the opening to close the opening or to hold the pivotable cover immobile at any position in between the first and second positions;

said gearmotor having a gear ratio sized to allow the opening of the pivotable cover under gravity only when the energizable brake is disengaged.

2. The automated ladder apparatus of claim 1, wherein the gear ratio of the gearmotor is sized to allow extension of each of said one or more of the plurality of ladder sections away from the pivotable cover under gravity only when the energizable brake is disengaged.

3. The automated ladder apparatus of claim 1, wherein the motorized system comprises a single gearmotor.

4. The automated ladder apparatus of claim 1, wherein the energizable brake is fitted with a manual release and the energizable brake is disengaged via the manual release.

5. The automated ladder apparatus of claim 1, wherein said energizable brake is engaged when power to the brake is off and is released when power to the brake is on.

6. The automated ladder apparatus of claim 1, wherein the gear ratio is in the range of 1/40 to 1/15.

7. The automated ladder apparatus of claim 1, wherein the gear ratio is sized such that a speed of opening of the pivotable cover and extension of said one or more of the plurality of ladder sections away from the pivotable cover corresponds to a rotational speed of the at least one reel of about from 60 to 100-rotation per minute (rpm).

8. The automated ladder apparatus of claim 1, wherein the motorized system is arranged such that the shaft is provided in the vicinity of the aft end of the cover.

9. The automated ladder apparatus of claim 1, further comprising a frame for installation in the elevated structure, the frame including a plurality of frame sections.

10. The automated ladder apparatus of claim 1, wherein said cable is connected from the at least one reel to the frame via only a first pulley and a second pulley that are each mounted on the frame.

11. The automated ladder apparatus of claim 10, wherein the first pulley is mounted at a vicinity of the pivot axis and the second pulley mounted on the frame at a vicinity of a location occupied by the shaft when the pivotable cover closes the opening.

12. The automated ladder apparatus of claim 1, wherein the pivotable cover is hingedly connected to the frame such that the pivotable cover is pivotable about the pivot axis.

13. The automated ladder apparatus of claim 1, wherein the gearmotor is configured to control the unwinding of the cable and regulate a speed of speed of opening of the pivotable cover and extension of the one or more of the plurality of ladder sections away from the pivotable cover by gravity.

14. The automated ladder apparatus of claim 1, wherein no single electric or mechanical failure leads to a dynamic opening of the pivotable cover with the one or more of the plurality of sliding sections retracted on it or partly extended on it.

15. A method of operating an automated ladder apparatus mounted on a cover and including a plurality of ladder sections to provide access to a space above or below an elevated structure, the automated ladder apparatus including a pivotable cover for an opening in said elevated structure that is pivotable about a pivot axis; a motorized system comprising a gearmotor and an energizable brake, the gearmotor comprising a single motor and a gearbox, the motorized system being mounted on said pivotable cover such that the motorized system and the pivotable cover are movable in unison when the pivotable cover pivots about the pivot axis, said pivotable cover being pivotable between at least a first position to allow access to the space through the opening and a second position in which the cover substantially covers said opening; said motorized system is configured to retract one or more of the plurality of ladder sections on the pivotable cover, then to move the cover against the opening to close it; said motorized system is configured to pivot the pivotable cover so as to move the pivotable cover away from the opening, then to extend said one or more of the plurality of ladder sections away from the pivotable cover; said motorized system being coupled to at least one shaft fitted directly mounted with at least one reel, said at least one shaft being directly driven by and aligned with an output shaft of the gearbox; said at least one reel coupled to at least one of said plurality of ladder sections via a cable to either (a) assist the pivotable cover to move away from the opening, then to extend said one or more of the plurality of ladder sections away from the cover, or (b) retract on the pivotable cover said one or more of the plurality of ladder sections then to move the pivotable cover against the opening to close it, or both (a) and (b); said gearmotor being coupled to the energizable brake; said energizable brake being configured to hold the pivotable cover over the opening to close the opening or to hold the pivotable cover immobile at any position in between the first and second positions; said gearmotor having a gear ratio sized to allow the opening of the pivotable cover under gravity only when the energizable brake is disengaged, the method comprising:

opening the pivotable cover opening and extending said one or more of the plurality of ladder sections away from the pivotable cover either by (a) energizing said gearmotor or (b) gravity only, wherein (a) energizing said gearmotor and (b) gravity only, each being capable of opening the pivotable cover opening and extending said one or more of the plurality of ladder sections away from the pivotable cover, and wherein a speed of extension of said one or more of the plurality of ladder sections away from the pivotable cover by gravity only is carried out when the gearmotor is not energized and is determined by the gear ratio of the gearmotor.

16. The method of claim 15, wherein the gear ratio is sized such that the speed of the pivotable cover opening and the extension of the one or more of the plurality of ladder sections away from the pivotable cover in (b) corresponds to a rotational speed of the at least one reel of about from 60 to 100 round per minute (rpm).

17. The method of claim 15, wherein the gear ratio is in the range of 1/40 to 1/15.

* * * * *